United States Patent [19]
Terry et al.

[11] Patent Number: 6,059,652
[45] Date of Patent: May 9, 2000

[54] REGISTER FOR A VEHICLE

[75] Inventors: Warren W. Terry, Lawton; Michael A. Dinsmore, Scotts, both of Mich.

[73] Assignee: Summit Polymers, Inc., Kalamazoo, Mich.

[21] Appl. No.: 09/211,386

[22] Filed: Dec. 14, 1998

Related U.S. Application Data

[60] Provisional application No. 60/069,709, Dec. 16, 1997.

[51] Int. Cl.⁷ .................................................... B60H 1/24
[52] U.S. Cl. .......................... 454/155; 454/154; 454/316
[58] Field of Search ................................... 454/154, 155, 454/313, 314, 316, 319

[56] References Cited

U.S. PATENT DOCUMENTS

| | | |
|---|---|---|
| 2,224,312 | 12/1940 | O'Day . |
| 3,709,139 | 1/1973 | Behles . |
| 3,921,507 | 11/1975 | Condet et al. ........................... 454/155 |
| 4,266,722 | 5/1981 | Nawa et al. . |
| 4,327,869 | 5/1982 | Nawa et al. . |
| 4,388,950 | 6/1983 | Stouffer et al. . |
| 4,556,172 | 12/1985 | Sugawara et al. . |
| 4,570,533 | 2/1986 | Sugawara et al. . |
| 4,585,177 | 4/1986 | Sugawara et al. . |
| 4,607,565 | 8/1986 | Sugawara et al. . |
| 4,677,904 | 7/1987 | Natsumeda et al. . |
| 4,699,322 | 10/1987 | Jobst . |
| 4,824,023 | 4/1989 | Sugawara . |
| 4,905,580 | 3/1990 | Komori et al. . |
| 4,957,036 | 9/1990 | Fujihara et al. . |
| 5,056,420 | 10/1991 | Komori et al. . |
| 5,058,388 | 10/1991 | Shaw et al. . |
| 5,099,752 | 3/1992 | Bosley . |
| 5,129,858 | 7/1992 | Komori et al. . |
| 5,176,569 | 1/1993 | Jardinier et al. . |
| 5,259,815 | 11/1993 | Stouffer et al. . |
| 5,674,124 | 10/1997 | Davis ................................. 454/316 X |
| 5,752,877 | 5/1998 | Sun ......................................... 454/155 |

FOREIGN PATENT DOCUMENTS

| | | | |
|---|---|---|---|
| 59-119130 | 7/1984 | Japan ..................................... 454/155 |
| 63-131947 | 6/1988 | Japan ..................................... 454/155 |

*Primary Examiner*—Harold Joyce
*Attorney, Agent, or Firm*—Rader, Fishman, Grauer & McGarry

[57] ABSTRACT

An improved ventilation register for a vehicle and the like is provided which comprises an elongated housing adapted to be mounted in a vehicle and having an inlet opening adapted to be connected to a source of air and an outlet opening adapted to distribute the air into a vehicle compartment. A grille assembly is mounted in the outlet opening of the elongated housing and comprising a grille housing having an inlet opening in register with the inlet opening of the elongated housing and an outlet opening in register with the outlet opening of the elongated housing. At least one directional vane can be mounted in the grille housing which is adapted to direct the flow of air passing through the outlet opening of the elongated housing. A flow directing baffle can be provided in the elongated housing between the inlet opening and the grille assembly adapted to separate the flow of air passing through the elongated housing into two streams and to divert one of the two streams into a first direction different from the other of the two streams. The elongated housing outlet opening or the grille can have a curved surface in register with the one stream of air and downstream from the flow directing baffle to direct the one stream of air toward the other stream of air.

20 Claims, 7 Drawing Sheets

REGISTER FOR A VEHICLE

CROSS-REFERENCE TO RELATED APPLICATIONS

This application claims the benefit of U.S. patent application Ser. No. 60/069,709, filed Dec. 16, 1997.

BACKGROUND OF THE INVENTION

1. Field of the Invention

The invention relates to a ventilation register for a vehicle such as heating and/or air conditioning registers, and more specifically, to a ventilation register for a vehicle which incorporates a Coanda effect passage to increase the efficiency of the register.

2. Description of the Related Art

A ventilation register for a vehicle typically comprises a fluid passageway interconnected at one end with a source of pressurized air at a preselected temperature and velocity, and at an opposite end with a grille which is directionally adjustable so that the air flow stream can be selectively directed into a passenger compartment of the vehicle. Examples of such prior art ventilation registers are shown in U.S. Pat. Nos. 5,129,858 and 4,957,036, issued Jul. 14, 1992 and Sep. 18, 1990.

A known scientific principle, generally known as the Coanda effect, relates to the placement of a body or other three-dimensional member within an air flow stream. The Coanda effect is realized by the tendency of the air to flow tangentially to the body and circulate around curves on the member, even through bends of 180° or more. Some prior art ventilation registers have incorporated Coanda effect principles into the structure thereof. Examples of these prior art registers which incorporate Coanda effect structures therein include U.S. Pat. Nos. 5,259,815, 4,570,533, and 4,556,172, issued Nov. 9, 1993, Feb. 18, 1986, and Dec. 3, 1985. The tendency of the air to adhere to a curved surface through the Coanda effect typically aids the directional vanes placed at an exit point of the grille in efficiently directing air into the vehicle passenger compartment. These types of barriers typically have a large cross-sectional area which can also work to decrease the efficiency of the register.

SUMMARY OF THE INVENTION

The invention relates to an improved ventilation register for a vehicle and the like comprising an elongated housing adapted to be mounted in a vehicle and having an inlet opening adapted to be connected to a source of air and an outlet opening adapted to distribute the air into a vehicle compartment. A grille assembly is mounted in the outlet opening of the elongated housing and comprises a grille housing having an inlet opening in register with the inlet opening of the elongated housing and an outlet opening in register with the outlet opening of the elongated housing. At least one directional vane is preferably mounted in the grille housing and adapted to direct the flow of air passing through the outlet opening of the elongated housing.

In one aspect, the invention relates to a flow directing baffle disposed in the elongated housing between the inlet opening and the grille assembly and adapted to separate the flow of air passing through the elongated housing into two streams and to divert one of the two streams into a first direction different from the other of the two streams. In addition, at least one of the elongated housing outlet opening and the grille preferably has a curved surface in register with the one stream of air and downstream from the flow directing baffle to direct the one stream of air toward the other stream of air.

At least a portion of the flow directing baffle can be mounted to the elongated housing for pivotal movement about an axis transverse to a longitudinal axis of the elongated housing to vary the angle of the first direction. The flow directing baffle preferably comprises a fixed portion and a movable portion, the latter of which is mounted for pivotal movement about an axis transverse to a longitudinal axis of the elongated housing between a first position wherein the movable portion is generally aligned with the fixed portion, and a second position wherein the pivotal portion is at least partially transverse to the fixed portion so that the flow of the one stream of air is at least partially obstructed through the elongated housing.

The grille assembly can be mounted to the housing for pivotal movement between a first position wherein the grille assembly restricts one of the two streams from exiting the register, and a second position wherein the curved surface directs the one stream of air in register with the curved surface back toward the other stream of air. The flow directing baffle can be generally aligned with the curved surface when the grille assembly is moved to the second position. The curved surface can be located on the grille assembly and on the elongated housing adjacent to the outlet opening. The at least one directional vane can comprise a plurality of directional vanes movably mounted to the elongated housing. Each of the plurality of directional vanes can be located in a generally parallel alignment with the remainder of the plurality of directional vanes. The outlet end of the housing can have the curved surface which is directed toward the grille assembly and is adapted to receive one of the streams of air and direct it back toward the other stream of air. The elongated housing can be generally rectangular or generally circular in cross section.

In another aspect, the invention relates to an improved ventilation register for a vehicle and the like wherein the elongated housing has a longitudinal axis and a sidewall disposed at an acute angle to the longitudinal axis. The sidewall preferably is adapted to divert a first portion of the air stream in a first direction at an acute angle to the longitudinal axis of the elongated housing and the grille assembly has a curved surface downstream from the sidewall in register with the first portion and a second portion of the air stream to deflect the first and second portions of the air stream in a second direction transverse to the direction of the first air stream portion.

The grille assembly can be mounted to the housing for pivotal movement between a first position wherein the grille assembly directs the first portion of the air stream in the first direction, and a second position wherein the grille assembly deflects the first and second portions of the air stream in the second direction.

Other objects, features, and advantages of the invention will be apparent from the ensuing description in conjunction with the accompanying drawings.

BRIEF DESCRIPTION OF THE DRAWINGS

The invention will now be described with reference to the drawings in which.

DETAILED DESCRIPTION OF THE PREFERRED EMBODIMENTS

FIGS. 1–7 show a first and second embodiments of a register 10 typically for use with a conventional vehicle air conditioning or heating system as is conventionally known. The register 10 is typically installed in at least one location within a vehicle interior, such as a dashboard, roof interior, central console, door interior, etc. The components of the register 10 are typically constructed of a rigid polymeric material unless otherwise noted although it will be understood that any rigid material is sufficient for constructing the register 10, as described herein.

As shown in FIGS. 1–4, a first embodiment of the register 10 comprises a housing 12, a grille 14, at least one and preferably several directional vanes 16, and an actuator dial 18.

The housing 12 comprises an elongated wall 20 which can be of any geometric configuration. However, typical elongated walls for registers are of rectangular or cylindrical configuration as is well known. The elongated wall 20 has a first open end 22 which is adapted to be interconnected to a source of air and pressure, e.g., a fan, at a predetermined temperature and velocity and a second open end 24 which has a radially-extending portion 26 which provides an interior surface for mounting the grille 14 with appropriate clearance therefor. The elongated wall 20 of the housing preferably defines an interior chamber 38 therein. The second end 24 of the elongated wall 20 is also provided with a face panel 28 which preferably has an aperture 30 adapted to receive at least a portion of the grille 14 therein. Further, a vertically-extending aperture 32 is defined adjacent one side of the aperture 30. A pair of indicator apertures 34 and 36 are defined above and below the vertically-extending aperture 32, respectively, to indicate the open or closed condition of the register 10.

Figures 1, 2:
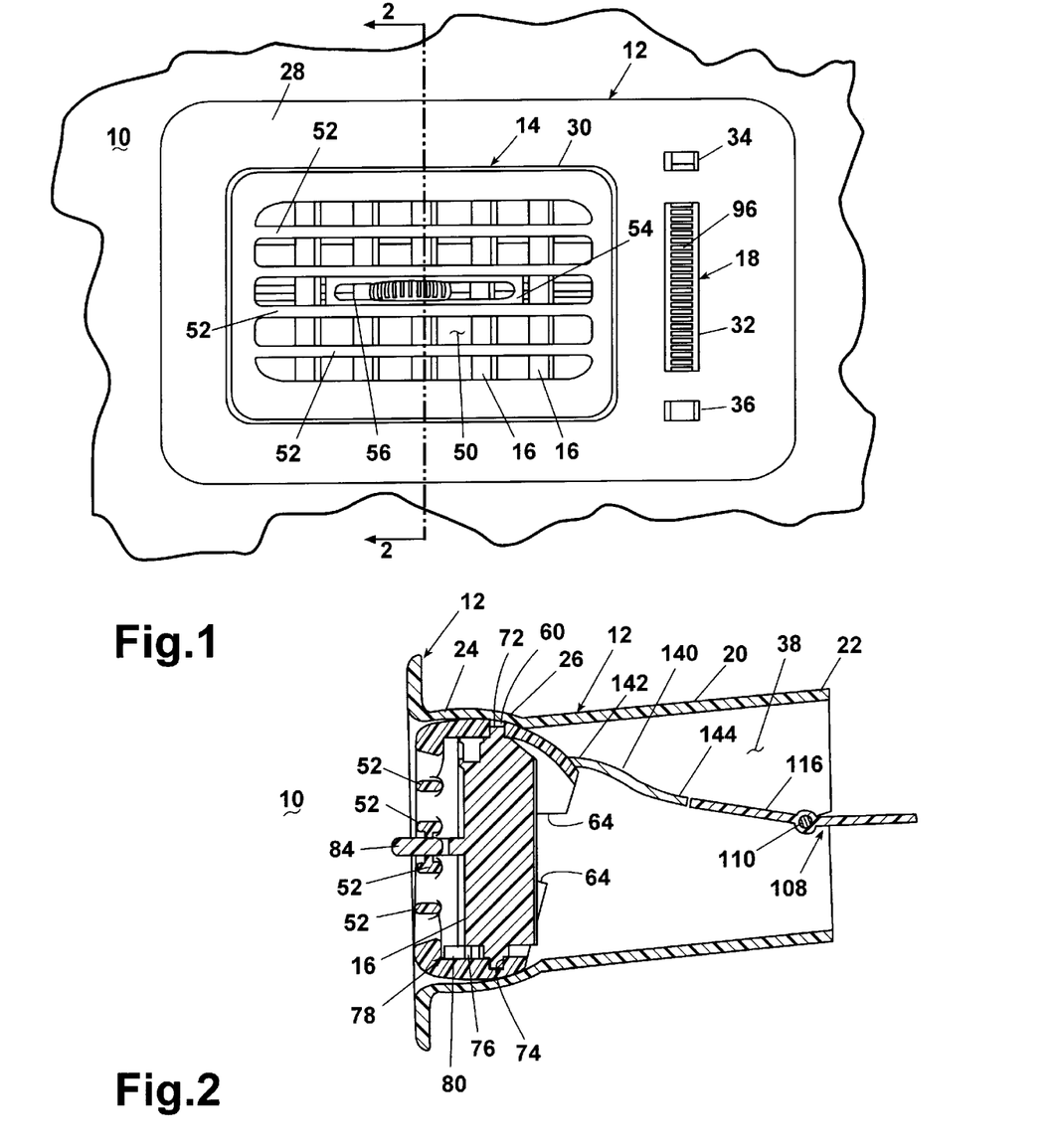
FIG. 1 is a front elevational view of a first embodiment of a register for a passenger compartment of a vehicle according to the invention shown in a rectangular configuration.
FIG. 2 is a cross-sectional view of the register taken along lines 2—2 of FIG. 1.
Figure 3:
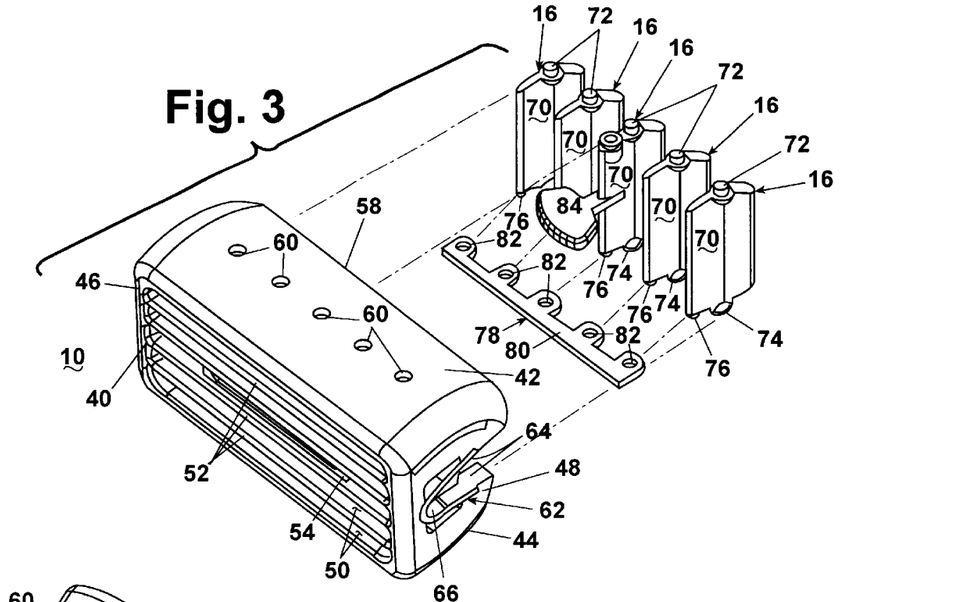
FIG. 3 is an exploded perspective view of the register of FIG. 1 showing the installation of directional vanes into the grille of the register with the remaining components of the register removed for clarity.
Figure 4:
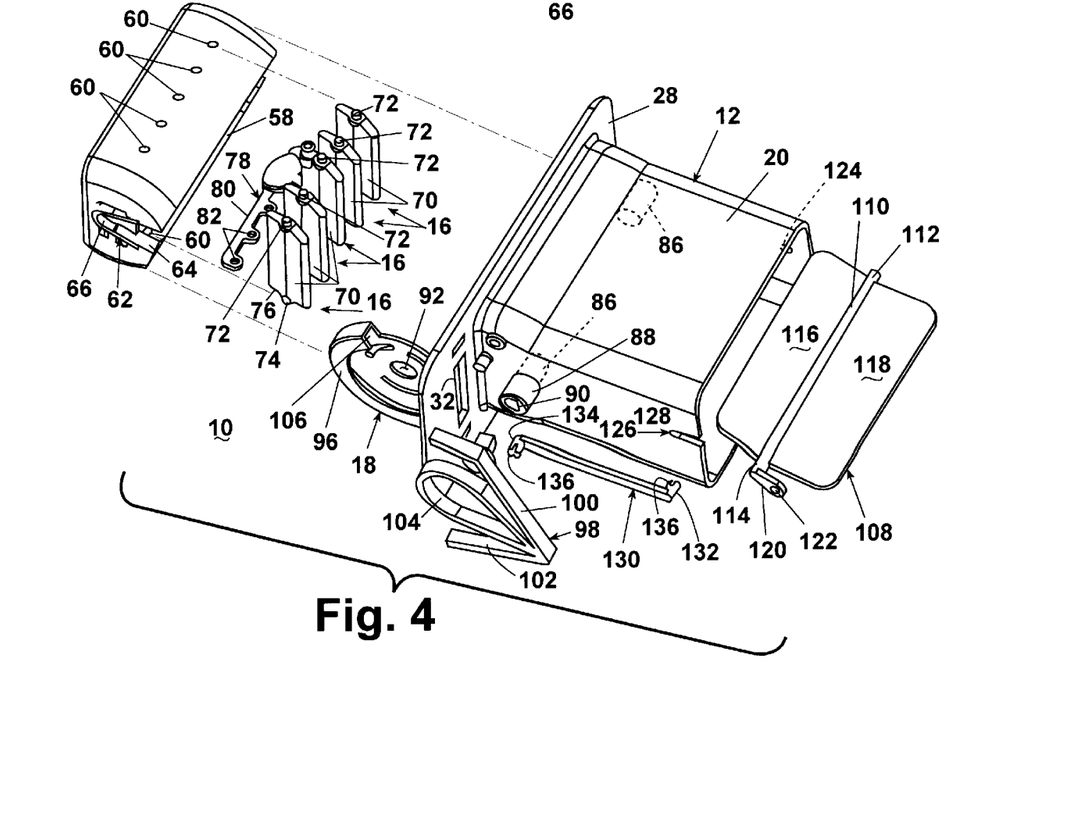
FIG. 4 is an exploded perspective view of the register of FIG. 1.

The grille 14 is shown in FIGS. 1–2 and in greater detail in FIGS. 3–4 and comprises a body generally defined by a front wall 40, a top wall 42 and a bottom wall 44 which are interconnected by a pair of lateral side walls 46 and 48. A front wall 40 has a recess 50 which extends substantially across the face of the front wall 40 and is provided with several horizontal vanes 52 which extend across the recess 50. A web 54 extends between a pair of adjacent horizontal vanes 52 at a central portion of the recess 50 and includes an elongated recess 56 therein.

The top and bottom walls 42 and 44 of the grille 14 each comprise a rearwardly-extending surface which slopes inwardly at rearward edge 58. The slope of the top and bottom walls 42 and 44 enable the grille 14 to be rotatably mounted within the radially extending portion 26 of the housing 12. Each of the top and bottom walls 42 and 44 are provided with a plurality of spaced apertures 60.

The side walls 46 and 48 of the grille 14 each comprise a rearwardly-extending surface which laterally interconnect the top and bottom walls 42 and 44 and the front wall 40. Each of these side walls 46 and 48 is provided with a longitudinally-extending notch 62 defined by a pair of opposing tapering walls 64 which terminate at a rounded socket 66.

The directional vanes 16 comprise an aerodynamic body 70 having top and bottom protrusions 72 and 74, respectively, extending axially from a central portion thereof. In addition, a lower surface of each vertical vane 68 includes a forward protrusion 76. An alignment rod 78 is also provided which comprises an elongated body 80 which is provided with several spaced bearings 82, each of which is adapted to receive a forward protrusion 76 of a vertical vane 68.

Each of the directional vanes 16 is mounted to the grille 14 by journalling the top and bottom protrusions 72 and 74 within corresponding apertures 60 of the top and bottom walls 42 and 44, respectively. The forward protrusion 76 of each of the directional vanes 16 is mounted within a corresponding bearing 82 of the alignment rod 78 so that movement of one of the directional vanes 16 mounted to the grille 14 moves all of the vertical vanes mounted thereto in unison. One of the directional vanes 16, preferably one mounted at a central portion of the grille 14, can be provided with a forwardly-extending handle 84 which, when the vertical vane 68 provided with the handle 84 is mounted to the grille 14, the handle 84 extends within the elongated recess 56 of the web 54 provided on the front wall 40 of the grille 14. A user can thereby position the directional vanes 16 by laterally rotating the handle 84 so that the directional vanes 16 are repositioned parallely to each other in a particular angular alignment with respect to the grille 14 so that air flowing therethrough is directed in a particular direction.

The grille 14 is pivotally mounted within the recess 50 of the face panel 28 of the housing 12 by urging the notches 62 of the side walls 46 and 48 upon a corresponding cylindrical protrusion 86 extending inwardly from opposing lateral side walls of the housing 12. Preferably, the cylindrical protrusions 86 are mounted within the socket 66 of the notches 62 in each side wall 46 and 48 thereof so that a force applied adjacent an upper or lower edge of the front wall 40 of the grille 14 rotates the grille 14 about a transverse axis defined by the cylindrical protrusions 86 of the housing 12 so that the grille 14 can be repositioned in a different angular alignment with respect to the housing 12. Thus, repositioning of the handle 84 of the directional vanes 16 and rotation of the grille 14 about the cylindrical protrusions 86 allows a great deal of flexibility to direct air flow through the grille 14 in a particular direction into a passenger compartment of a vehicle.

The actuator dial 18 is rotatably mounted about an exterior extension 88 of one of the cylindrical protrusions 86 of the housing 12. The extension 88 has a keyed socket 90 at an outer axial end thereof. A central aperture 92 of the actuator dial 18 is passed over the extension 88 and a pin 94 adapted to be received by the socket 90 is inserted into the socket 90 so that the actuator dial 18 is rotatably mounted thereto with a grip portion 96 disposed within the vertically-extending aperture 32 of the face panel 28 of the housing 12. A V-shaped guide 98 is mounted adjacent the actuator dial 18 which includes a pair of legs 100 and 102 and a central loop portion 104. The legs 100 and 102 have distal ends which are mounted within the indicator apertures 34 and 36 of the face panel 28 of the housing 12 and the loop portion 104 is disposed within an interior groove 106 of the grip portion 96 of the actuator dial 18. The legs 100 and 102 of the V-shaped guide 98 define upper and lower limits of rotational travel for the actuator dial 18. The legs 100 and 102 can also be provided with colored indicia thereon which register with the corresponding indicator apertures 34 and 36 of the housing 12. The grip portion 96 is adapted to conceal the indicia on the legs 100 and 102, depending on the rotational position of the actuator dial 18 with respect to the housing 12, to provide a visual indication to a user of the open/closed state of the register 10.

A baffle 108 comprises an elongated rod 110 having a first end 112 and a second end 114 wherein the rod 110 is provided with a pair of laterally-extending panels 116 and 118. Preferably, the panels 116 and 118 are aligned in at an obtuse angle with respect to one another. It will be understood that other angular configurations, such as a 180° alignment, can be provided without departing from the scope of this invention. The second end 114 of the rod 110 is provided with a tangentially-extending flange 120 which has an aperture 122 extending therethrough, preferably in parallel with the rod 110.

The baffle 108 is mounted to the housing 12 by extending the first end 112 of the rod 110 within an aperture 124 in a lateral side wall of the elongated wall 20 and snap-fitting the second end 114 within an elongated notch 126 having a rounded socket 128 therein so that the rod 110 and its associated panels 116 and 118 are disposed within the interior chamber 38 of the elongated wall 20. Consequently, rotation of the flange 120 between a first position and a second position locates the baffle 108 in an opened and closed position with respect to the interior chamber 38 of the housing 12.

An actuator rod 130 is provided which has a first end 132 and a second end 134. Each of the ends 132 and 134 of the rod 130 is provided with a split flange 136. The split flange 136 on the first end 132 of the rod 130 is adapted to be snap-fit within the aperture 122 of the flange 120 of the baffle 108. The split flange 136 on the second end 134 of the rod 130 is adapted to be snap-fit within an aperture (not shown) adjacent a circumferential edge of the actuator dial 18. When the actuator rod 130 is connected to both the actuator dial 18 and the baffle 108, rotation of the actuator dial 18 moves the first end 132 of the rod 130, which, in turn, rotates the baffle 108 between an opened, closed or an intermediate position with respect to the chamber 38 of the housing 12. Thus, the actuator dial 18 can be used to control the amount, if any, of air flow through the housing 12 and out of the grille 14.

The housing 12 is provided with a flow-dividing panel 140 which extends across the chamber 38. The flow-dividing panel 140 has an upwardly curved surface provided with a leading edge 142 located adjacent a rearward edge of the top wall 42 of the grille 14 and a trailing edge 144 located adjacent the panel 116 of the baffle 108 when the baffle 108 is located in a full-open position. As shown in FIG. 2 and schematically in FIGS. 5–7, the flow-dividing panel 140, in cooperation with the panels 116 and 118 of the baffle 108, divides air flow through the chamber 38 of the housing 12 into a first flow path, marked "A" and a second flow path, marked "B".

Air flow stream "A" flows over the flow-dividing panel 140 over the leading edge 142 thereof, and out of the grille 14.

Air flow stream "B" flows beneath the flow-dividing panel 140 and through the grille 14 where it is directed into the passenger compartment of a vehicle by the vertical and horizontal vanes 16 and 52 respectively.

Figure 5:
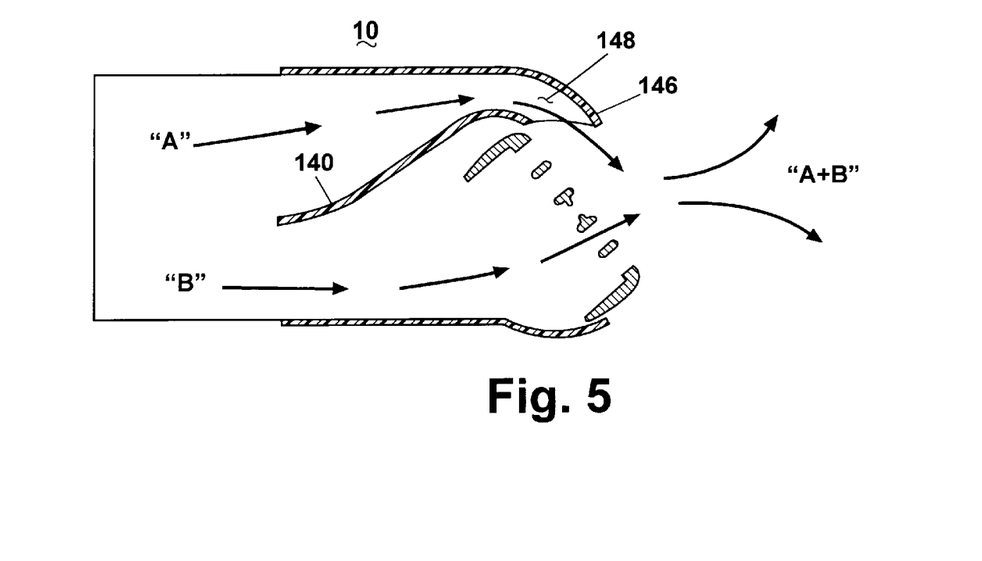
FIG. 5 is a longitudinal cross-sectional schematic view of a second embodiment of the register of FIG. 1 showing a baffle in the register defining an upper flow path which terminates in a downwardly-curved portion and showing the grille positioned in an upward direction so that a pair of flow paths defined therein merge downstream thereof.
Figure 6:
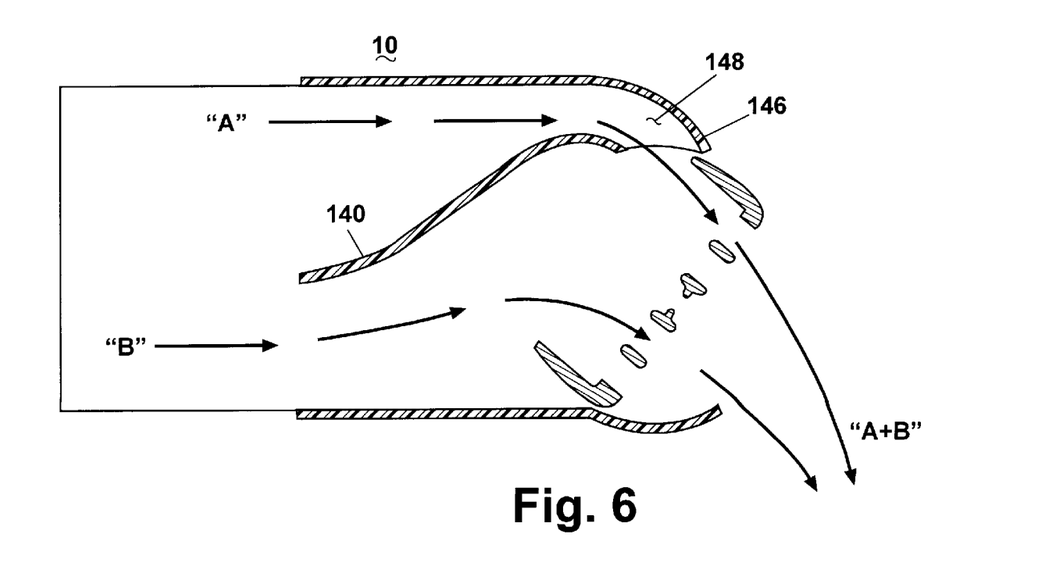
FIG. 6 is a longitudinal cross-sectioned schematic view of the register of FIG. 5 showing the grille positioned in a downward direction and the pair of flow paths merging downstream thereof.
Figure 7:
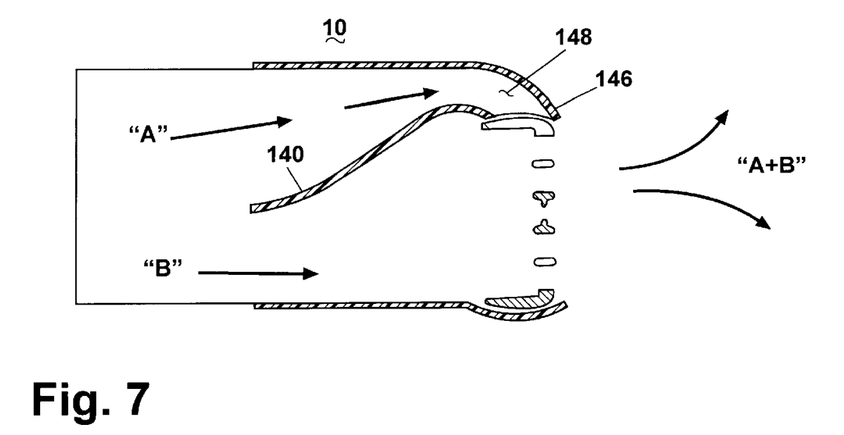
FIG. 7 is a longitudinal cross-sectional schematic view of the register of FIG. 5 with the grille positioned in a neutral position showing an air flow path downstream of the grille.

It will be noted that in the second embodiment of the register 10 shown in FIGS. 5, 6 and 7, showing the grille 14 in an upper, lower and intermediate position, respectively, the air flow stream "A" adheres to the curved surface of the flow-dividing panel 140 via the Coanda effect as in the first embodiment. Further, the second embodiment housing 12 is provided with a downwardly-curved portion 146 which creates a flow restriction 148 which thereby increases the velocity of air flow stream "A" therethrough when the grille 14 is positioned in the lower position as shown in FIG. 6. As the air flow stream "A" exits the flow restriction 148 and enters the grille 14, air flow stream "A" merges with air flow stream "B" and creates and intensified merged air flow streams "A+B" downstream of the grille 14. The direction applied to air flow stream "A" via the Coanda effect and the direction applied to air flow stream "B" via the positioning of the vanes 16 and 52 and the grille 14 provide for an air flow of increased velocity and efficiency which exits the register 10 into the passenger compartment of the vehicle. This aids in providing additional velocity to the air flow exiting the grille when the grille is in the lower position of FIG. 6.

It should be also noted that the grille 14 can partially obstruct the upper flow path "A" when the grille is located in the intermediate position of FIG. 7 so that the air exits the grille with a reduced velocity compared with the lower position which results in more wide disbursement of the air flow.

In the upper position, the air flow streams "A" and "B" can actually interfere with one another to widely disburse the air flow exiting the grille 14 and have a reduced velocity compared to when the grille 14 is in the lower postion.

FIGS. 8–12 show a third embodiment of a register 210 for a vehicle interior according to the invention. The components of the register 210 described herein are also constructed of a rigid polymeric material unless otherwise noted although it will be understood that any rigid material is sufficient for constructing the register 210 as described herein.

As shown in FIGS. 8–11, the register 210 comprises a housing 212 having a first portion 213 and a second portion 215, a grille 214 having a directional vane 216 and an actuator dial 218.

Figure 8:
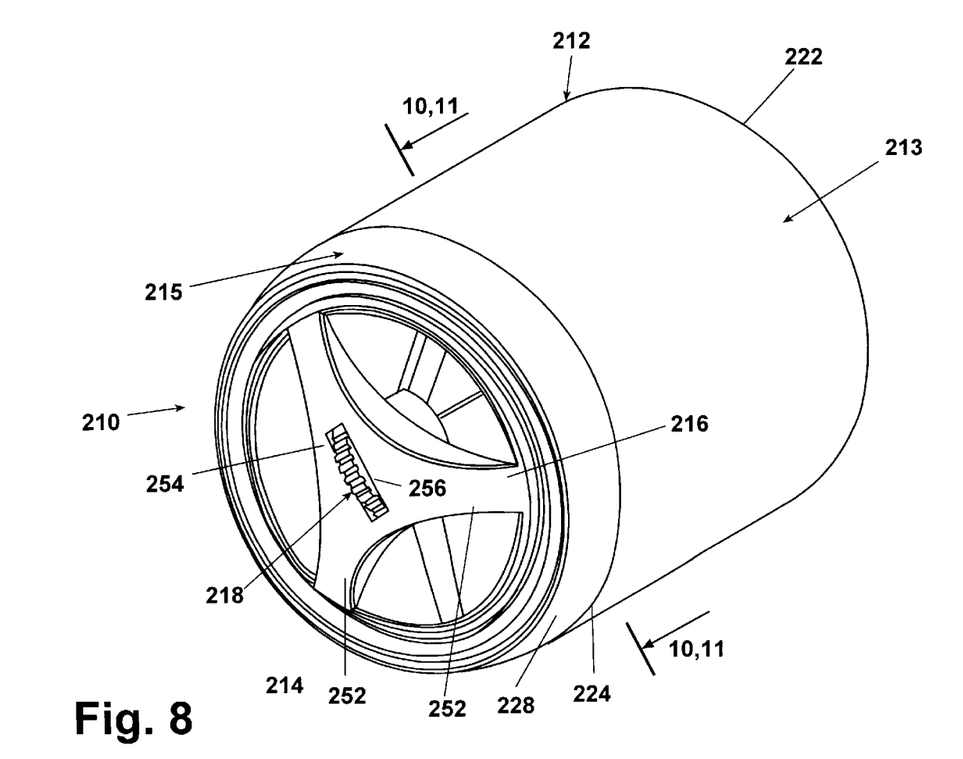
FIG. 8 is a third embodiment of the register according to the invention shown in a cylindrical configuration.
Figure 9:
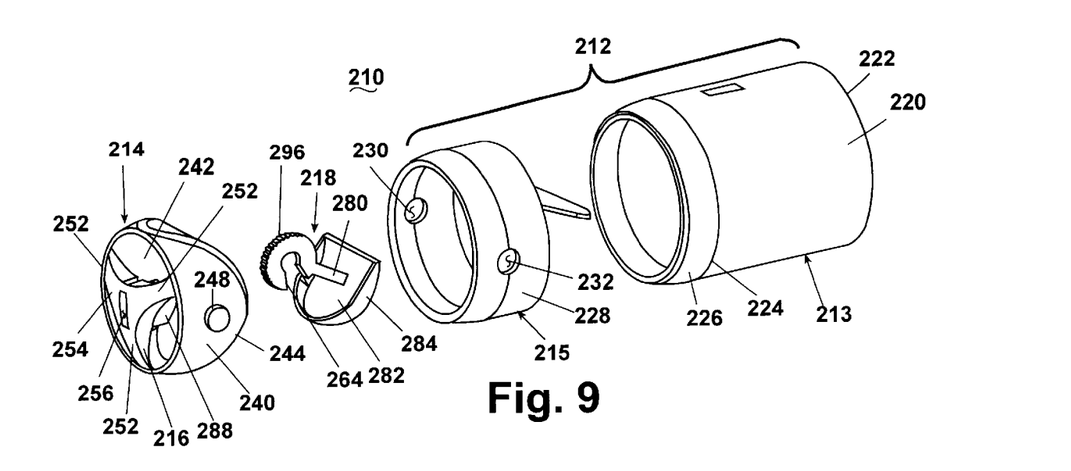
FIG. 9 is an exploded perspective view showing the assembly of the components of the third embodiment of the register of FIG. 8.

The first portion 213 of the housing 212 comprises a cylindrical wall 220 having a first end 222 adapted to be interconnected to a source of pressurized air at a predetermined temperature and velocity and a second end 224 which has a reduced-diameter sleeve 226 which provides a surface for mounting the second portion 215 of the housing 212. The elongated wall 220 of the housing preferably defines an interior chamber 238 therein.

The second portion 215 of the housing 212 comprises a cylindrical wall 228 which has an interior diameter corresponding to an exterior diameter of the reduced-diameter sleeve 226 of the first portion 213 of the housing 212. A pair of apertures 230 and 232 are disposed on a common diameter of the cylindrical wall 228. A flow-dividing panel 340 is mounted to the cylindrical wall 228 and extends angularly and downwardly from an upper portion thereof. The panel 340 extends rearwardly of the cylindrical wall 228 as well.

The grille 214 comprises a body generally defined by a cylindrical wall 240 having a pair of rearwardly-extending opposing flanges 242 and 244 which are each provided with a cylindrical protrusion 246 and 248, respectively, at a central portion thereof. The cylindrical wall 240 includes a circular recess 250 which extends substantially across the face of the cylindrical wall 240 and is provided with several radially-extending vanes 252 which extend across the recess 250. A web 254 is defined at a central portion of the recess 250 by the vanes 252 and includes an elongated recess 256 therein.

The second portion 215 is rotatably mounted to the first portion 213 of the housing 212 by coaxially extending the reduced-diameter sleeve 226 of the first portion 213 within the cylindrical wall 228 of the second portion 215. The second portion 215 of the housing 212 can thereby be rotated with respect to the first portion about a common longitudinal axis.

The grille 214 is pivotally mounted to the second portion 215 of the housing 212 by journaling the protrusions 246 and 248 on the grille 214 into the corresponding apertures 230 and 232, respectively, of the second portion 215 of the housing 212. The air flow exiting the grille 214 can thereby be directionally adjusted about two axes—rotation of the second portion 215 about the longitudinal axis of the first portion 213, and pivotal movement of the grille 214 with respect to the second portion 215 of the housing 212 about an axis defined by the protrusions 246 and 248 thereof.

The actuator dial 218 comprises a ring-shaped grip portion 296 interconnected to a shaft 280 which, in turn, terminates in a transversely-extending plate 282. The plate 282 is preferably U-shaped in configuration and has an upstanding wall 284 located around a perimetrical bight portion thereof. The grip portion 296 includes a slotted portion defined by tapering walls 264 which terminate in a rounded socket 266 located in the center of the grip portion 296.

Figure 10:
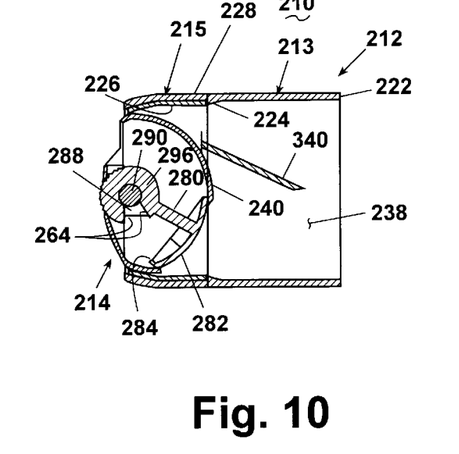
FIG. 10 is a cross-sectional view of the register of FIG. 8 taken along lines 10—10 thereof showing a grille positioned in a nominal direction.
Figure 11:
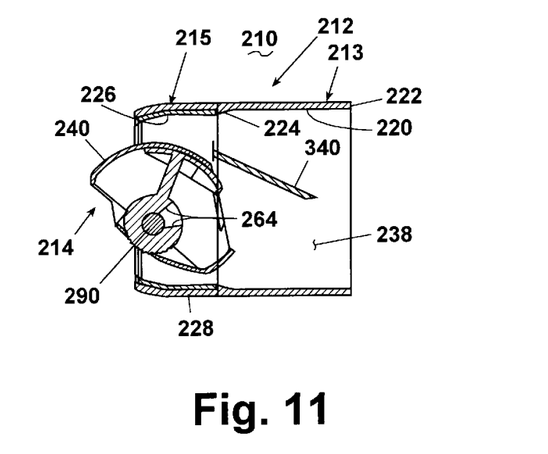
FIG. 11 is a cross-sectional view of the third embodiment of the register of FIG. 8 taken along lines 11—11 thereof shown with the grille positioned in a downward direction.

The actuator dial 218 is pivotally mounted to a bearing portion 288 disposed behind the web 254 which includes a transversely-extending shaft 290 by passing the shaft 290 between the tapering walls 264 so that the shaft 290 is journalled within the socket 266. The actuator dial 218 is thereby pivotable between a first closed position as shown in FIG. 10 and a second open position as shown in FIG. 11. In the closed position, the plate 282 obstructs air flow exiting the grille 214 from the chamber 238 while, in the open position, the plate 282 has been rotated out of obstruction thereof. To actuate the dial 218, a user need merely urge the grip portion 296, which can be provided with a textured outer surface, in a particular desired direction.

The flow-dividing panel 340 of the housing 212 extends across the chamber 238 and has an upwardly angled or curved surface provided with a leading edge 342 located adjacent a rearward edge of the grille 214 and a trailing edge 344 located rearwardly therefrom. As shown in FIGS. 10–11 and schematically in FIG. 12, the flow-dividing panel 340 divides the air flow stream through the chamber 238 of the housing 212 into a first flow path, marked "A" and a second flow path, marked "B".

Figure 12:
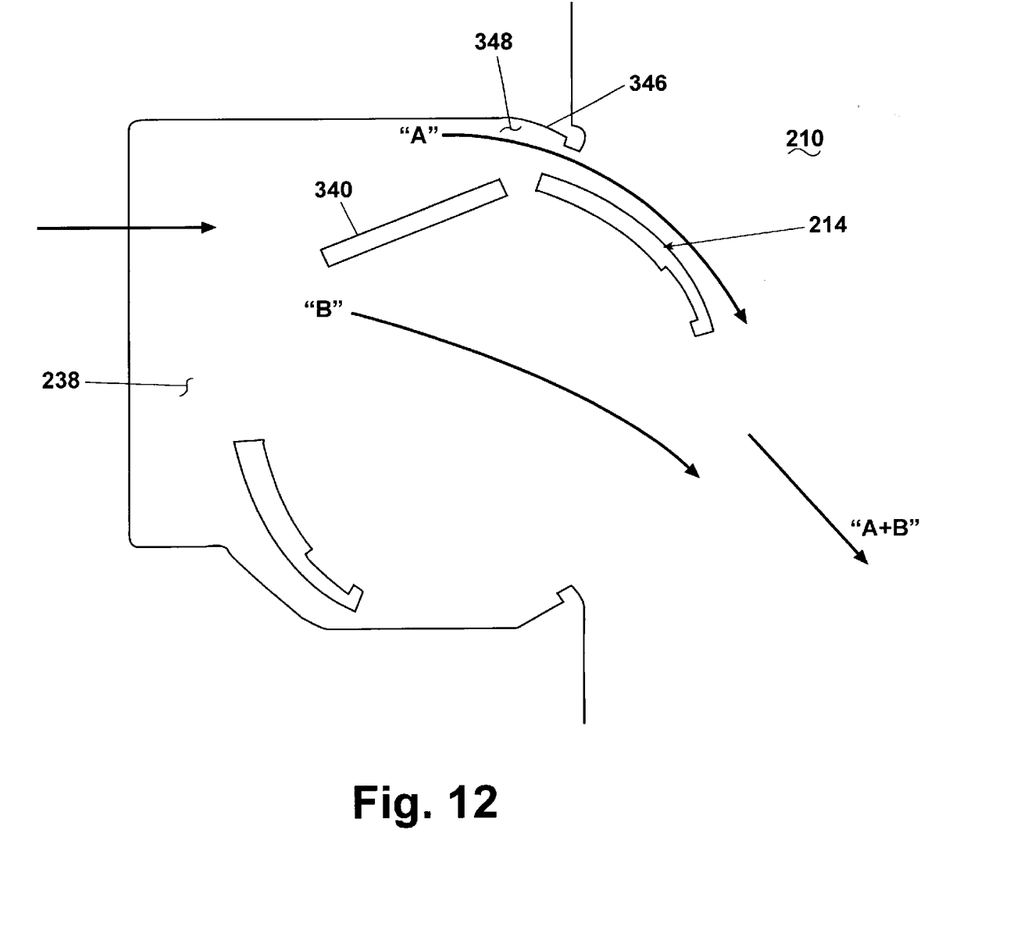
FIG. 12 is a longitudinal cross-sectional schematic view of the register of FIG. 8 with the grille positioned in a downward direction and showing the merging of a pair of air flow streams downstream of the grille.

Air flow stream "A" flows over the flow-dividing panel 340 over the leading edge 342 thereof, and out of the grille 214. Air flow stream "B" flows beneath the flow-dividing panel 340 and through the grille 214 where it is directed into the passenger compartment of a vehicle by the grille 214. The flow-dividing panel 340 located adjacent the grille 214 causes air flow stream "A" to adhere to the curved surface of the flow-dividing panel 340 via the Coanda effect. Further, the housing 212 can be provided with a downwardly-curved portion 346 creating a flow restriction 348 which thereby increases the velocity of air flow stream "A" therethrough. As the air flow stream "A" exits the flow restriction 348 and enters the grille 214, air flow stream "A" merges with air flow stream "B" and creates an intensified merged air flow streams "A+B" downstream of the grille 214. It will be understood that the direction applied to air flow stream "A" via the Coanda effect and the direction applied to air flow stream "B" via the positioning of the grille 214 provide for an air flow stream of increased velocity and efficiency which exits the register 210 into the passenger compartment of the vehicle.

Figure 13:
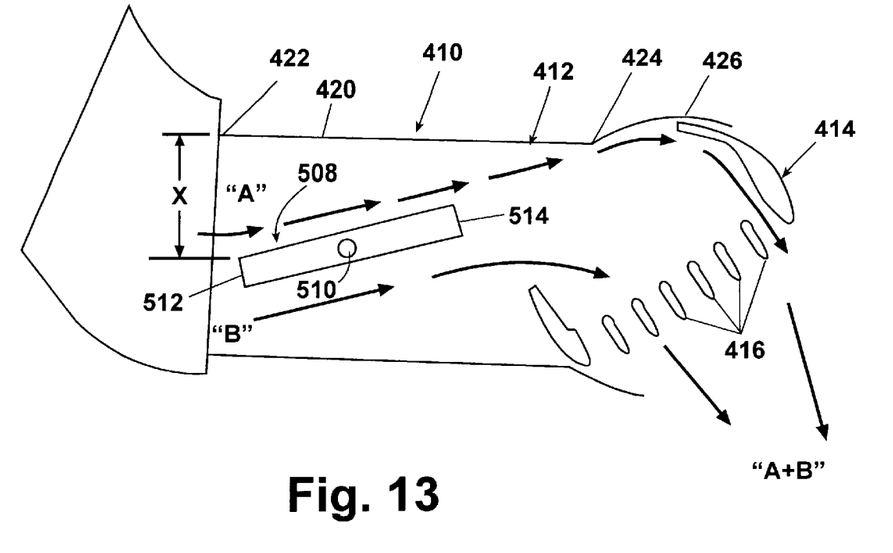
FIG. 13 is a longitudinal cross-sectional schematic view of the register of either FIGS. 1 or 8 wherein a baffle for controlling the air flow stream through the register forms a flow dividing panel in a position intermediate open and closed positions of the baffle so that an air flow stream entering the register is divided into a pair of streams which merge downstream thereof.

FIG. 13 shows an alternative embodiment to the registers 12 and 212 shown in FIGS. 1–4, 5–7 and 8–12, respectively. The reference numerals of the embodiment shown in FIGS. 1–7 have been increased by 400 and the reference numerals for like components of the embodiment shown in FIGS. 8–12 have been increased by 200 to show common components with the embodiment of FIG. 13.

A register 410 comprises a housing 412, a grill 414 with directional vanes 416 which are positionable by an actuator (not shown). The housing 412 includes an elongated wall 420 which can be of any geometric configuration. The elongated wall 420 has a first open end 422 adapted to be interconnected to a source of air and pressure, e.g., a fan, at a predetermined temperature and velocity. The elongated wall 420 also has a second open end which has a radially-extending portion 426 which provides an interior surface for mounting the grille 414 with appropriate clearance therefor as described with respect to the previous embodiments of the register according to the invention.

The register 410 is provided with a baffle 508 pivotally mounted to sidewalls of the housing 412 by a shaft 510. The baffle 508 comprises any appropriately-sized elongated member adapted to be pivoted by the rod 510 between a closed position wherein the baffle 508 obstructs air flow streams through the housing 412 and an open position whereby air flow streams flow passed the baffle 508 and outwardly from the register 410 through the grille 414. It is an important feature of the embodiment of FIG. 13 of the register according to the invention that the baffle 508 be positionable in at least one position intermediate the fully-open and fully-closed positions thereof so that the baffle 508 acts to divide air flow entering the end 422 of the housing 412 into air flow streams "A" and "B". The air flow stream "A" flows over, and is directed by, an upper surface of the baffle 508 toward the grille 414. Air flow stream "B" flows beneath the baffle 508 toward the grille 414 wherein the air flow streams "A" and "B" merge downstream of the grille 414 into a combined air flow stream "A plus B".

It can be seen in FIG. 13 that the baffle 508 is preferably located in an angular position relative to the housing 412 so that a first end 512 of the baffle 508 is positioned lower than a second end 514 thereof. The first end 512 of the baffle 508, preferably located toward the end 422 of the housing 412, is preferably located a distance X from the elongated wall 420. It has been found that, although any distance X can be provided for the configuration of the baffle 508 relative to the elongated 420 of the housing 412, that a dimension X comprising approximately 60% of the width of the elongated wall 420 is preferable. Although this dimension X can be altered to optimize the air flow through the register 410. This selective positioning of the baffle 508 eliminates the need for a permanent baffle, such as that shown at 240 in FIG. 2, to be provided within the interior of the housing 412 for the register 410. Further, because the shaft 510 of the baffle 508 is generally positionable by a user, the air flow "A+B" through the grille 414 can be optimized for the individual needs of each user.

Figure 14:
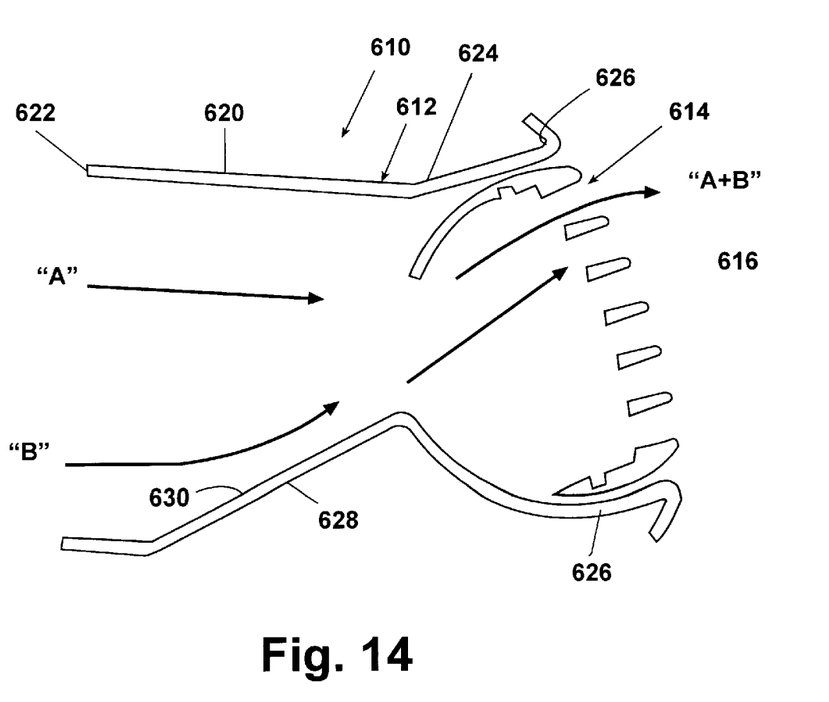
FIG. 14 is a longitudinal cross-sectional schematic view of the register of either FIGS. 1 or 8 wherein an elongated wall of a housing for the register forms a baffle for redirecting the air flow stream passing therethrough.

FIG. 14 shows yet another embodiment for the air flow register for a vehicle according to the invention whereby referenced numerals for the embodiments shown in FIGS. 1–4 and 5–7 have been increased by 500 and referenced numerals for common components of the embodiment shown in FIGS. 8–12 have been increased by 400. As shown in FIG. 14, a register 610 comprises a housing 612 and a grille 614 having one or more directional veins 616 and operable by an actuator (not shown). The housing 612 generally comprises an elongated wall 620 having a first open end 622 connectable with a source of air and pressures described with the previous embodiments herein. The elongated wall 620 also has a second open end 624 having a radially-extending portion 626 adapted to receive at least a portion of the grille 614 therein. As in the previous embodiments, air flow streams enter the first open end 622 of the housing 612 and travel toward the second end 624 thereof and exit the grille 614.

In the embodiment shown in FIG. 14, the elongated wall 620 is provided with an inwardly-extending discontinuity 628 thereon which is adapted to deflect a portion "B" of air flow stream "A" travelling through the housing 612. The discontinuity 628 is provided in the form of an inwardly-extending ramp surface 630 in the embodiment shown in FIG. 14, although other geometrical configurations for the discontinuity 628 are contemplated without departing from the scope of this invention. These other geometrical configurations can include substantially rectangular, circular, elliptical and terraced. The deflection of air flow stream "B" toward air flow stream "A" causes the air flow streams "A" and "B" to merge downstream of the grille 614 into a combined air flow stream "A+B". The deflection of air flow stream "B" occurs due to the Coanda effect and results in a combined air flow stream "A+B" of increased velocity and efficiency.

The embodiment shown in FIG. 14 provides easy assembly and a reduction of parts, as the baffle for the housing 612 has been eliminated in favor of the discontinuity 628 located on a portion of the elongated wall 620 thereof.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments for which an exclusive property or privilege is claimed are defined as follows:

1. In an improved ventilation register for a vehicle and the like comprising:

an elongated housing adapted to be mounted in a vehicle and having an inlet opening adapted to be connected to a source of air and an outlet opening adapted to distribute the air into a vehicle compartment;

a grille assembly mounted in the outlet opening of the elongated housing and comprising a grille housing having an inlet opening in register with the inlet opening of the elongated housing and an outlet opening in register with the outlet opening of the elongated housing, and at least one directional vane mounted in the grille housing and adapted to direct the flow of air passing through the outlet opening of the elongated housing;

the improvement which comprises:

a flow directing baffle in the elongated housing between the inlet opening and the grille assembly and adapted to separate the flow of air passing through the elongated housing into two streams and to divert one of the two streams into a first direction different from the other of the two streams; and at least one of the elongated housing outlet opening and the grille having a curved surface in register with the one stream of air and downstream from the flow directing baffle to direct the one stream of air toward the other stream of air.

2. The improved register of claim 1 wherein at least a portion of the flow directing baffle is mounted to the elongated housing for pivotal movement about an axis transverse to a longitudinal axis of the elongated housing to vary the angle of the first direction.

3. The improved register of claim 1 wherein the flow directing baffle comprises a fixed portion and a movable portion, the latter of which is mounted for pivotal movement about an axis transverse to a longitudinal axis of the elongated housing between a first position wherein the movable portion is generally aligned with the fixed portion, and a second position wherein the pivotal portion is at least partially transverse to the fixed portion so that the flow of the one stream of air is at least partially obstructed through the elongated housing.

4. The improved register of claim 3 wherein the grille assembly is mounted to the housing for pivotal movement between a first position wherein the grille assembly restricts one of the two streams from exiting the register, and a second position wherein the curved surface directs the one stream of air in register with the curved surface back toward the other stream of air.

5. The improved register of claim 4 wherein the flow directing baffle is generally aligned with the curved surface when the grille assembly is moved to the second position.

6. The improved register of claim 5 wherein the curved surface is located on the grille assembly.

7. The improved register of claim 5 wherein the curved surface is located on the elongated housing adjacent to the outlet opening.

8. The improved register of claim 5 wherein the at least one directional vane comprises a plurality of directional vanes movably mounted to the elongated housing.

9. The improved register of claim 8 wherein each of the plurality of directional vanes is located in a generally parallel alignment with the remainder of the plurality of directional vanes.

10. The improved register of claim 9 wherein the elongated housing is generally rectangular in cross section.

11. The improved register of claim 9 wherein the elongated housing is generally circular in cross section.

12. The improved register of claim 1 wherein the grille assembly is mounted to the housing for pivotal movement between a first position wherein the grille assembly restricts one of the two streams from exiting the register, and a second position wherein the curved surface directs the one stream of air in register with the curved surface back toward the other stream of air.

13. The improved register of claim 12 wherein the flow directing baffle is generally aligned with the curved surface when the grille assembly is moved to the second position.

14. The improved register of claim 1 wherein the curved surface is located on the grille assembly.

15. The improved register of claim 1 wherein the curved surface is located on the elongated housing adjacent to the outlet opening.

16. The improved register of claim 1 wherein the at least one directional vane comprises a plurality of directional vanes movably mounted to the elongated housing.

17. The improved register of claim 16 wherein each of the plurality of directional vanes is located in a generally parallel alignment with the remainder of the plurality of directional vanes.

18. The improved register of claim 1 wherein the outlet end of the housing has the curved surface directed toward the grille assembly which is adapted to receive one of the streams of air and direct it back toward the other stream of air.

19. The improved register of claim 1 wherein the elongated housing is generally rectangular in cross section.

20. The improved register of claim 1 wherein the elongated housing is generally circular in cross section.

* * * * *